(12) United States Patent
Greif (10) Patent No.: US 8,413,682 B2
(45) Date of Patent: Apr. 9, 2013

(54) FLUID VALVES HAVING AN INTEGRAL SAFETY SHUT-OFF

(75) Inventor: David Joseph Greif, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 109 days.

(21) Appl. No.: 13/031,458

(22) Filed: Feb. 21, 2011

(65) Prior Publication Data

US 2011/0140029 A1 Jun. 16, 2011

Related U.S. Application Data

(63) Continuation of application No. 12/269,657, filed on Nov. 12, 2008, now Pat. No. 8,033,294.

(51) Int. Cl.
*F16K 27/00* (2006.01)

(52) U.S. Cl.
USPC ..................... 137/614.21; 251/367

(58) Field of Classification Search ............. 137/614.21, 137/613; 251/367
See application file for complete search history.

(56) References Cited

U.S. PATENT DOCUMENTS

| | | | |
|---|---|---|---|
| 645,208 | A | 3/1900 | Mayer et al. |
| 1,257,019 | A | 2/1918 | Parker et al. |
| 1,949,784 | A | 3/1934 | Crossen |
| 2,283,605 | A | 5/1942 | Johnson |
| 2,469,719 | A | 5/1949 | Ford |
| 3,280,836 | A | 10/1966 | Callahan et al. |
| 4,685,310 | A * | 8/1987 | Stegmann et al. ....... 137/614.21 |
| 2010/0117020 | A1 | 5/2010 | Greif |

FOREIGN PATENT DOCUMENTS

| | | |
|---|---|---|
| EP | 1498645 | 1/2005 |
| FR | 588211 | 5/1925 |
| GB | 1147429 | 4/1969 |

OTHER PUBLICATIONS

Patent Cooperation Treaty, "Written Opinion of the International Searching Authority," issued by the International Searching Authority in connection with related PCT application No. PCT/US2009/058200, mailed Dec. 10, 2009 (6 pages).

Patent Cooperation Treaty, "International Search Report," issued by the International Searching Authority in connection with related PCT application No. PCT/US2009/058200, mailed Dec. 10, 2009 (7 pages).

(Continued)

*Primary Examiner* — Kevin Lee
(74) *Attorney, Agent, or Firm* — Hanley, Flight & Zimmerman, LLC (57) ABSTRACT

Fluid valves having an integral safety shut-off are described. An example valve assembly includes a body defining a flow path between an inlet and an outlet and opposing seating surfaces. The example valve assembly includes first valve trim including a first valve stem operatively coupled to a first closure member, the first closure member to engage one of the seating surfaces to control fluid flow between the inlet and the outlet during normal operation. The example valve assembly includes second valve trim including a second valve stem operatively coupled to a second closure member, the second closure member to engage the other one of the seating surfaces during a failure condition to restrict fluid flow between the inlet and the outlet. A surface of the second closure member to define a partial wall of the flow path during normal operation such that a profile of the flow path defined by the body and the second closure member is substantially continuous.

18 Claims, 5 Drawing Sheets

OTHER PUBLICATIONS

United States Patent and Trademark Office, "Non-Final Office Action," issued in connection with U.S. Appl. No. 12/269,657, on Sep. 22, 2010 (8 pages).

United States Patent and Trademark Office, "Notice of Allowance," issued in connection with U.S. Appl. No. 12/269,657, on Jul. 7, 2011 (5 pages).

United States Patent and Trademark Office, "Non-Final Office Action," issued in connection with U.S. Appl. No. 12/269,657, on Mar. 11, 2011 (9 pages).

* cited by examiner

FLUID VALVES HAVING AN INTEGRAL SAFETY SHUT-OFF

RELATED APPLICATION

This patent arises from a continuation of U.S. patent application Ser. No. 12/269,657, filed Nov. 12, 2008, now U.S. Pat. No. 8,033,274, which is hereby incorporated herein by reference in its entirety.

FIELD OF THE DISCLOSURE

This patent relates generally to fluid valves and, more specifically, to fluid valves having an integral safety shut-off.

BACKGROUND

Control valves are commonly used in process plants to control the flow of a fluid (e.g., a gas, a liquid, etc.) or any other substance through pipes and/or vessels to which they are connected. A control valve is typically composed of one or more inlets and outlets, and includes a flow control element or member (e.g., a valve gate, a piston, a valve plug, a closure member, etc.) that operates to control fluid flow through apertures that fluidly couple the inlet(s) to the outlet(s). A closure member is typically coupled to a valve bonnet that is mechanically coupled (e.g., bolted, clamped, threaded into, etc.) to the valve body. Typically, the closure member is configured to engage a sealing structure (e.g., a seat ring) that encompasses a flow path through the valve.

In practice, some process plants, in addition to control valves, include a safety shut-off valve (e.g., an emergency shut-off valve) positioned upstream or downstream from each of the control valves to quickly stop the flow of fluid in response to, for example, a system failure. While these safety shut-off valves provide many benefits to a fluid control process in some instances, the additional space and system length (e.g., pipe run lengths) required to incorporate the safety shut-off valves pose some challenges in designing a process plant, particularly in cases where available space is very limited.

In the past, many fluid control processes were designed without safety shut-off valves. However, there is a demand to update these processes with safety shut-off valves (e.g., safety integrated system hardware (SIS)) to ensure that system failures are properly contained. To do so, existing piping may have to be cut and/or re-routed to accommodate the additional space required by the safety shut-off valves. Alternatively, when designing new fluid processes, designers may have limited space in which to implement the safety shut-off valves and, thus, to do so, it may be difficult or impossible to position these safety shut-off valves within the fluid control process.

SUMMARY

An example valve assembly includes a body defining a flow path between an inlet and an outlet and opposing seating surfaces. The example valve assembly includes first valve trim including a first valve stem operatively coupled to a first closure member, the first closure member to engage one of the seating surfaces to control fluid flow between the inlet and the outlet during normal operation. The example valve assembly includes second valve trim including a second valve stem operatively coupled to a second closure member, the second closure member to engage the other one of the seating surfaces during a failure condition to restrict fluid flow between the inlet and the outlet. A surface of the second closure member to define a partial wall of the flow path during normal operation such that a profile of the flow path defined by the body and the second closure member is substantially continuous.

An example valve assembly providing safety shut off functionality includes a body defining a flow path between an inlet port and an outlet port. The example valve assembly includes a control valve including a first bonnet and a first closure member to control fluid flow through the body during normal operation by sealingly engaging a first seating surface. The example valve assembly includes a safety shut off valve including a second bonnet. The first bonnet and the second bonnet are substantially coaxially opposed. The safety shut off valve includes a second closure member to restrict fluid flow through the body during a failure condition by sealingly engaging a second seating surface. The second closure member includes a compliant seal to be positioned in a bore defined by the body during normal operation to substantially prevent fluid flow through the body from affecting the compliant seal.

An example valve assembly providing safety shut off functionality. The valve assembly includes a body defining a flow path between an inlet port and an outlet port and a control valve to control fluid flow through the flow path during normal operation. The example valve assembly includes a safety shut off valve including a first closure member to sealingly engage a first seating surface during a failure condition. The first closure member includes a tapered portion and a compliant seal adjacent the tapered portion. During the failure condition, the tapered portion is to sealingly engage a tapered surface of the first seating surface and the compliant seal is to sealingly engage a surface adjacent the tapered surface of the first seating surface.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example bonnet assemblies and example control valves described herein advantageously provide integral safety shut-off functionality in control valves, thereby eliminating the problems encountered with known valves and known safety shut-off valves, which are physically separated from their corresponding control valves. In particular, the example bonnet assemblies and example valves described herein provide an integral safety shut-off to enable valves to be installed that have the same face-to-face dimensions as known control valves while also including safety shut-off features and functionality. As a result, known fluid valves that are not provided with safety shut-off functionality can be relatively easily replaced with the example valves described herein. Specifically, because the example valves described herein have substantially the same face-to-face dimensions as known valves, existing piping does not have to be cut and/or re-routed, which significantly reduces installation time and costs. Additionally, in some examples, the example valves described herein may be provided with an example blank bonnet positioned opposite the first bonnet, which controls the flow of fluid through the valve during normal operation. The blank bonnet enables the example valves to be later retrofitted (e.g., in the field or while the valve remains installed in a process control system) with a second bonnet (as described in detail below) that provides safety shut-off functionality to the valve.

Figure 1:
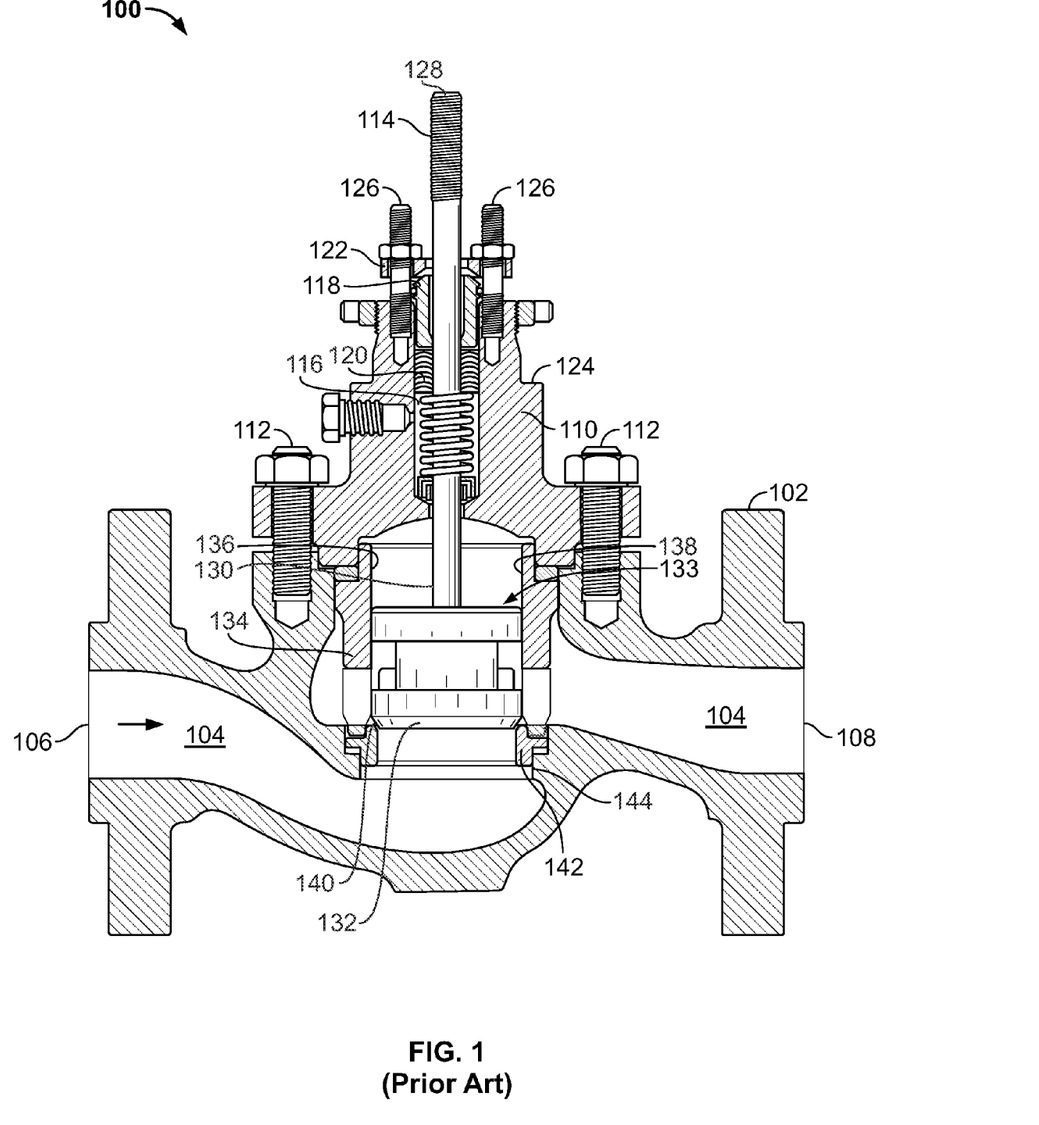
FIG. 1 depicts a known control valve.

FIG. 1 depicts a known control valve 100 that has a valve body 102 having a fluid flow passage way 104 between an inlet 106 and an outlet 108. A bonnet 110 is coupled to the valve body 102 via a plurality of fasteners 112. The bonnet 110 includes a bore 116 along with a packing follower 118 that urges a valve packing 120 in a sealing engagement against a stem 114 to substantially prevent fluid from exiting the bonnet 110 between the stem 114 and the valve packing 120. As shown, a packing flange 122 is coupled to the bonnet 110 via a plurality of fasteners 126 and the packing follower 118 is positioned between the packing flange 122 and the valve packing 120. An end 128 of the stem 114 extends from a bonnet body 124 and is operatively coupled to an actuator (not shown). Additionally, an opposite end 130 of the stem 114 is coupled to a closure member 132 (e.g., a plug).

To control fluid flow through the valve body 102, valve trim 133 is positioned between the inlet 106 and the outlet 108 to provide certain flow characteristics (e.g., to reduce noise and/or cavitation generated by the flow of fluid through the control valve 100). The valve trim 133 includes a cage 134, the closure member 132 and the stem 114. The closure member 132 has an outer surface 136 sized to slidingly engage an inner surface 138 of the cage 134. Additionally, the closure member 132 has a seating surface 140 to engage a seat 142 (e.g., a seat ring) positioned at least partially within an aperture 144 to control the flow of fluid between the inlet 106 and the outlet 108. In practice, the actuator moves the stem 114 between a closed position at which the seating surface 140 engages the seat 142 to prevent fluid from flowing through the control valve 100 and an open position at which the closure member 132 is spaced from the seat 142 to allow fluid to flow through the control valve 100.

Figure 2:
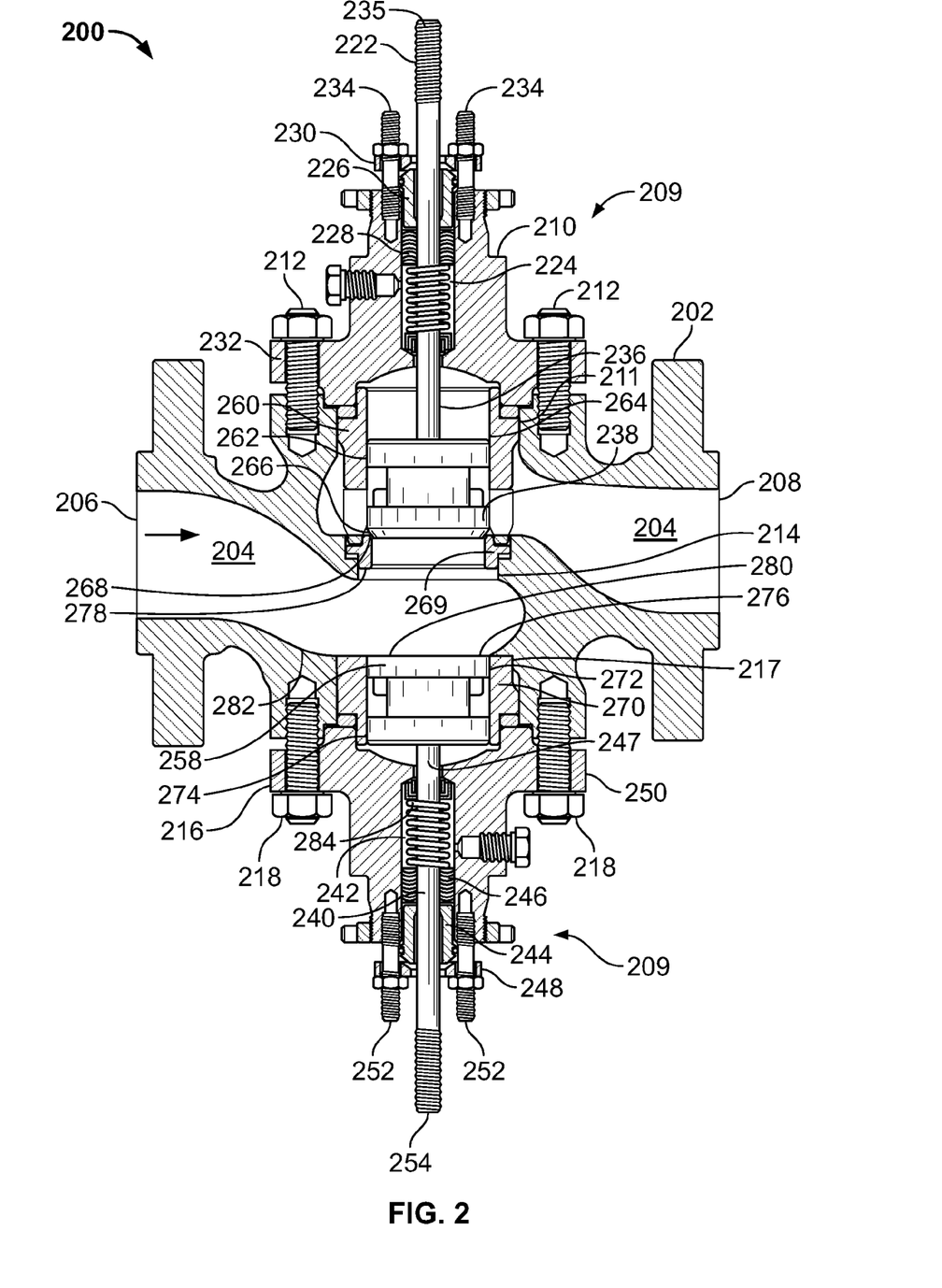
FIG. 2 depicts an example control valve having an integral safety shut-off.

FIG. 2 depicts an example control valve 200 that has a body 202 having a fluid flow passage way 204 between an inlet 206 and an outlet 208. While the example control valve 200 is depicted as a globe valve, the examples described herein can be implemented in any other type of valve such as, for example, other types of sliding stem valves.

A bonnet assembly 209 includes a first bonnet 210 and a second bonnet 216. The first bonnet 210 is positioned adjacent to a first bore 211 and coupled to the body 202 via a plurality of fasteners 212 on a first side of a flow control aperture 214 that fluidly couples the inlet 206 and the outlet 208. The second bonnet 216 (e.g., a field removable bonnet) is positioned adjacent to a second bore 217 and coupled to the body 202 via a plurality of fasteners 218 on a second side of the aperture 214 opposite the first bonnet 210. The first bore 211 is substantially coaxial with the second bore 217.

The first bonnet 210 receives a first stem or shaft 222, via the first bore 224, along with a first packing follower 226 that urges a first valve packing 228 in sealing engagement against the first stem 222 to substantially prevent fluid from exiting the first bonnet 210 between the first stem 222 and the first valve packing 228. The first bore 224 and first valve packing 228 guide the first stem 222 relative to the first bonnet 210. As shown, a first packing flange 230 is coupled to a first bonnet body 232 via a plurality of fasteners 234 and the first packing follower 226 is positioned between the first packing flange 230 and the first valve packing 228. An end 235 of the first stem 222 extends from the first bonnet body 232 and is operatively coupled to a first actuator (not shown). Additionally, an opposite end 236 of the first stem 222 is coupled to a first closure member 238.

Similarly, the second bonnet 216 receives a second stem or shaft 240, via the second bore 242, along with a second packing follower 244 that urges a second valve packing 246 in sealing engagement against the second stem 240 to substantially prevent fluid from exiting the second bonnet 216 between the second stem 240 and the second valve packing 246. The second bore 242 and the second valve packing 246 guide the second stem 240 relative to the second bonnet 216. As shown, a second packing flange 248 is coupled to a second bonnet body 250 via a plurality of fasteners 252 and the second packing follower 244 is positioned between the second packing flange 248 and the second valve packing 246. An end 254 of the second stem 240 extends from the second bonnet body 250 and is operatively coupled to a second actuator (not shown). Additionally, an opposite end 247 of the second stem 240 is coupled to a second closure member 258. It should be appreciated that the second stem 240 may be operatively coupled to any desired device to actuate the second closure member 258 between an open position and a closed position independent from the first closure member 238. For example, the second stem 240 may be operatively coupled to a stored energy actuation mechanism such as, for example, a coil spring or a stack of disc springs along with a retaining mechanism and/or latching system (e.g., a mechanical or hydraulic restraint) that retains the second closure member 258 in the open position during normal operation, but releases the second closure member 258 after a predetermined condition occurs such as, for example, a system failure.

To control fluid flow through the body 202, a first cage 260 is positioned between the inlet 206 and the outlet 208 to provide certain flow characteristics (e.g., quick opening, equal percentage, and/or to reduce noise and/or cavitation generated by the flow of fluid through the control valve 200). Generally, a first valve trim includes the first stem 222 and the first closure member 238. The first closure member 238 has an outer surface 262 sized to slidingly engage an inner surface 264 of the first cage 260. Additionally, the first closure member 238 has a first seating surface 266 to engage a first seat 268 of a seat ring 269 positioned at least partially within the aperture 214 to control the flow of fluid between the inlet 206 and the outlet 208. In practice, the first actuator (not shown) moves the first stem 222 between a closed position at which the first seating surface 266 engages the first seat 268 to prevent fluid from flowing through the control valve 200 and an open position at which the first closure member 238 is spaced from the first seat 268 to allow fluid to flow through the control valve 200.

Figure 3:
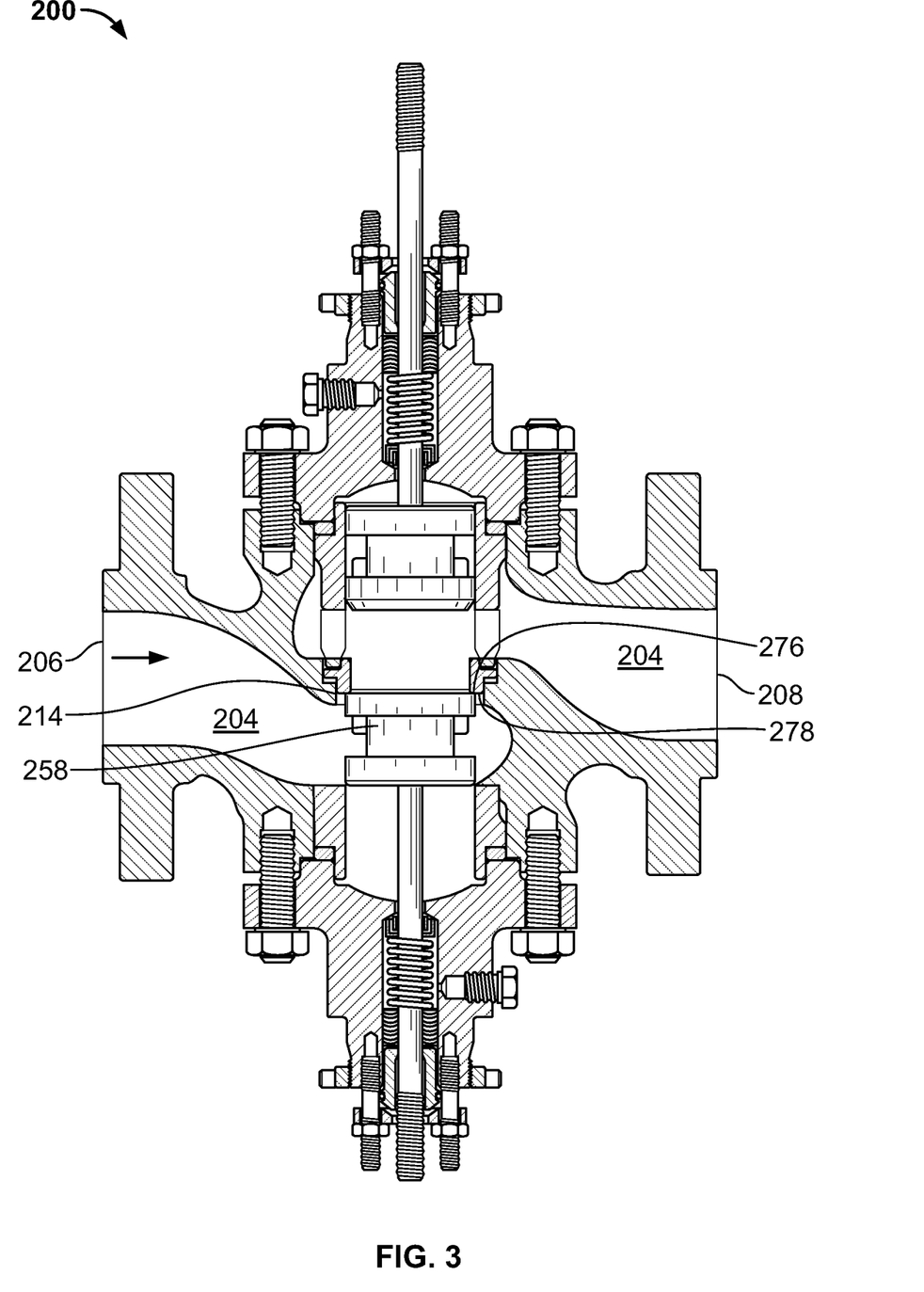
FIG. 3 depicts the example control valve of FIG. 2 with the integral safety shut-off operative to block fluid flow through the valve.

Additionally, the control valve 200 may be provided with a second guide 270 that is positioned opposite the first cage 260 and adjacent the second bonnet 216. Generally, a second valve trim includes the second stem 240 and the second closure member 258. Although not shown, in some examples, the second guide 270 may be integrally coupled to or an integral part of the second bonnet 216. The second closure member 258 has an outer surface 272 sized to slidingly engage an inner surface 274 of the second guide 270. Additionally, as shown in FIGS. 2 and 3, the second closure member 258 has a second seating surface 276 to engage a second seat 278 that opposes the first seat 268 and which is positioned at least partially within the aperture 214 to control the flow of fluid between the inlet 206 and the outlet 208 during, for example, a system failure. In this example, the first seat 268 is a first surface of the seat ring 269 and the second seat 278 is a second surface of the seat ring 269 that is opposite the first surface.

If the second closure member 258 moves and engages the second seat 278 (as shown in FIG. 3), the fluid flow through the control valve 200 substantially stops and the second closure member 258 remains seated against the second seat 278 until, for example, the second closure member 258 is manually moved back to the open position. Additionally, if the second bonnet 216 is implemented in a flow-up valve, such as the example control valve 200, a pressure drop across the control valve 200 and/or a fluid force against the second closure member 258 each at least partially assist the second closure member 258 in sealingly engaging the second seat 278 and, thus, relatively less force may be needed (e.g., a smaller and/or lighter actuator may be utilized) to maintain the position of the second closure member 258 relative to the second seat 278. However, in other examples, the examples described herein can be implemented in any other valve design such as, for example, a flow down valve.

In operation, the second bonnet 216 along with portions of the second valve trim provide safety shut-off functionality to the control valve 200 while enabling the example control valve 200 to maintain substantially the same face-to-face dimensions as the known control valve 100. Specifically, in contrast to known fluid control processes that require a separate safety shut-off valve, extra space and/or re-routed piping, the example control valve 200 includes both the first closure member 238 that controls the fluid flow through the control valve 200 during normal operation and the second closure member 258 that provides safety shut-off functionality to substantially stop the flow of fluid through the control valve 200 during, for example, a system failure. During normal operation, the second closure member 258 is positioned such that a surface 280 of the second closure member 258 is substantially flush with an inner surface 282 of the control valve 200 to substantially prevent the second closure member 258 from affecting the flow of the fluid through the control valve 200 when the second closure member 258 is not in use. In practice, the second closure member 258 is not often utilized and, thus, the components of the second bonnet 216 and the second valve trim may be made of relatively less expensive and/or less wear and/or corrosion resistant material. However, in other examples, the second closure member 258 may be contoured to provide a predetermined flow characteristic. For example, the surface 280 may include a contour or a curved surface (not shown) to provide flow disruption to induce turbulence in the flow stream to substantially reduce recirculation flow.

To replace the second bonnet 216 on the control valve 200, the fluid pressure is reduced (e.g., drained, blocked and/or the fluid may be re-routed around the control valve 200) from the pipe and/or vessel to which the control valve 200 is coupled and then the fasteners 218 are removed from the second bonnet body 250. The second bonnet 216 is then removed from the control valve 200. Next, a different second bonnet 216 may be positioned in the control valve 200 and the fasteners 218 may be retightened to ensure proper positioning of the second bonnet 216 relative to the body 202.

Alternatively, to replace a spring 284 positioned within the second bore 242 and/or the second valve packing 246 of the second bonnet 216 while the second bonnet 216 is coupled to the body 202 of the control valve 200, the fluid pressure is reduced from the pipe and/or vessel to which the control valve 200 is coupled and the fasteners 252 are removed from the second packing flange 248. Next, the second packing follower 244, the spring 284 and/or the second valve packing 246 are removed and replaced. The second packing flange 248 may then be repositioned relative to the second bonnet body 250 and the fasteners 252 are adjusted to compress the spring 284 to exert a force against the second valve packing 246 to create a fluid seal between the second stem 240 and the second valve packing 246.

Figure 4:
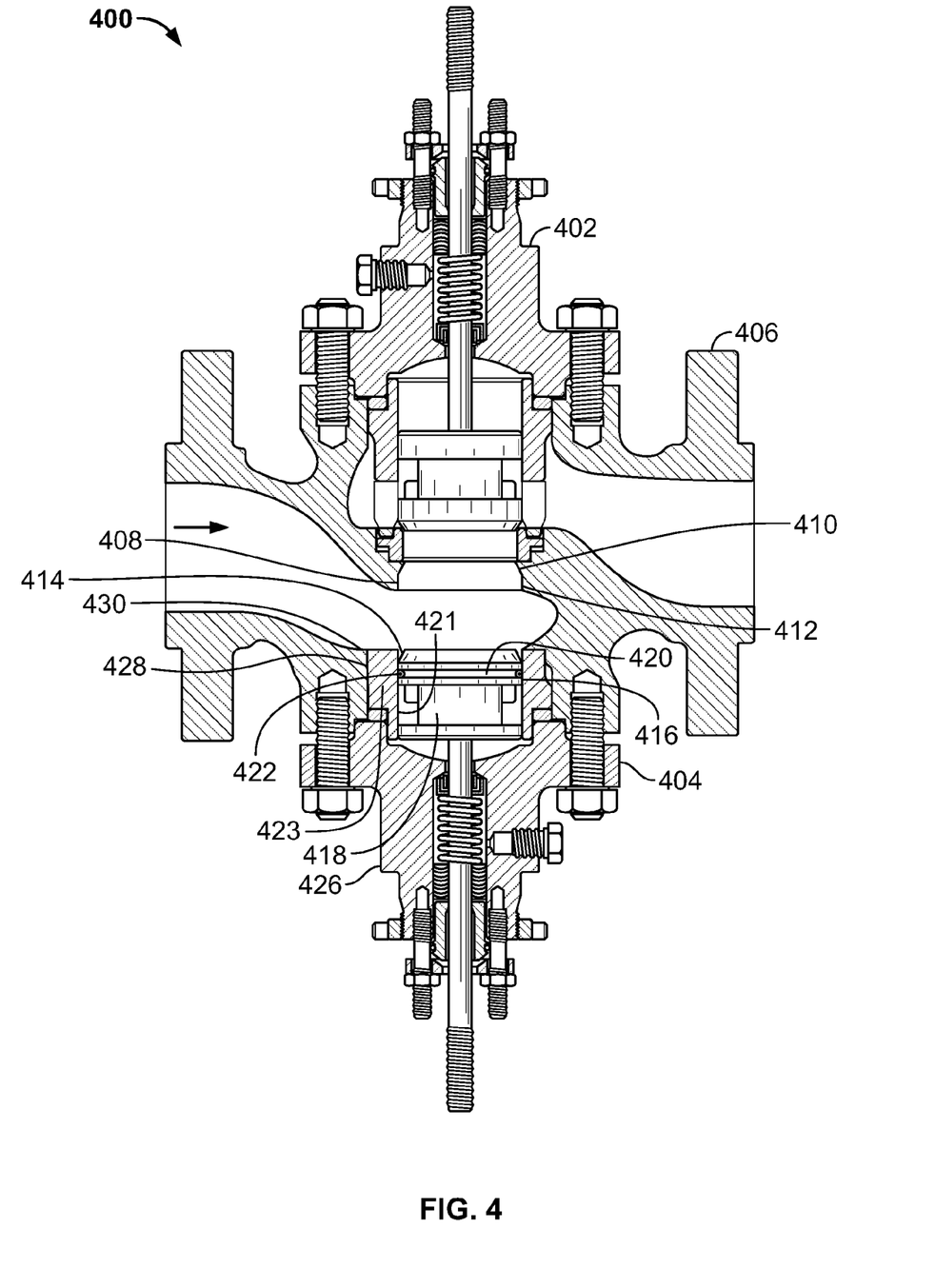
FIG. 4 depicts another example control valve having an integral safety shut-off.

FIG. 4 depicts another example control valve 400 that includes a first bonnet 402 and a second bonnet 404. The example control valve 400 is substantially similar to the example control valve 200 of FIGS. 2 and 3. However, in contrast to the example control valve 200, the example control valve 400 has a valve body 406 that includes a second seat 408 that has a tapered surface 410 and a surface 412 adjacent the tapered surface 410 that correspond to a tapered portion 414 and a longitudinal portion 416 of a second closure member 418, respectively. The longitudinal portion 416 has a groove 420 into which a seal 422 (e.g., an o-ring, a compliant seal, a quad ring, a molded disc, a lip seal, etc.) is positioned. During normal operation, the seal 422 is positioned within a bore 421 of a cage or guide 423 of the second bonnet 404 or the control valve 400 to substantially prevent a flow of fluid from affecting the seal 422. Specifically, limiting exposure of the seal 422 to the flow of fluid may advantageously extend the useful life of the seal 422 and/or substantially prevent the flow of the fluid from unseating the seal 422 from within the groove 420. Additionally, the tapered portion 414 of the second closure member 418 may minimize the effect that the second closure member 418 has on the flow of fluid through the control valve 400.

When the second closure member 418 moves and engages the second seat 408, the fluid flow through the control valve 200 substantially stops. Specifically, the seal 422 within the groove 420 engages the surface 412 and the tapered portion 414 engages the tapered surface 410. In some examples, the interaction between the tapered surface 410 and the tapered portion 414 is a metal-to-metal engagement and/or seal that limits the flow of fluid through the control valve 400 even if the fluid seal between the seal 422 and the surface 412 fails.

Figure 5:
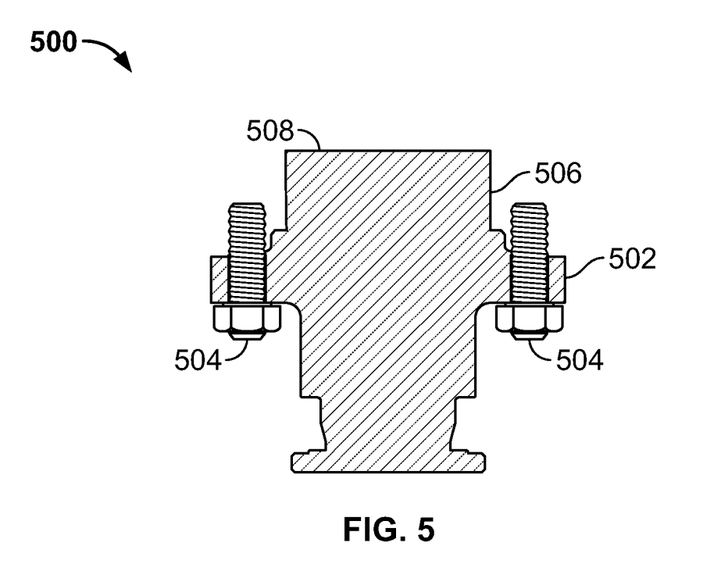
FIG. 5 depicts an example blank bonnet that may used to implement the example valves depicted FIGS. 2-4.

FIG. 5 depicts an example blank bonnet 500 having a flange 502 that receives a plurality of fasteners 504 to couple the blank bonnet 500 to the example control valve 200 or 400. Additionally, the blank bonnet 500 includes an elongated member or plug 506 that has a diameter that corresponds to a diameter of the second bore 217 or 428. If the blank bonnet 500 is implemented on the control valve 200 or 400, a surface 508 of the elongated member 506 is substantially flush with the inner surface 282 of the control valve 200 of FIGS. 2 and 3 and/or an inner surface 430 of the control valve 400 of FIG. 4 to substantially prevent the elongated member 506 from affecting the flow of the fluid through the control valve 200 or 400.

In practice, some users may be interested in creating a versatile fluid control process that initially does not have safety shut-off features. However, these users may want the ability to update their fluid control process in the future without cutting and/or re-routing piping to create the necessary space to install known safety shut-off valves, as is necessary in fluid control processes that include valves such as, the known control valve 100. To enable users to create such a fluid control process, the example control valve 200 or 400 may be initially implemented with the blank bonnet 500.

To replace and/or field replace the blank bonnet 500 with the second bonnet 216 or 404, the fluid pressure is reduced from the pipe and/or vessel to which the control valve 200 or 400 is coupled and then the fasteners 504 are removed from the flange 502. The blank bonnet 500 is then removed from the control valve 200 or 400. Next, the second bonnet 216 or 404 may be positioned in the control valve 200 or 400 and the fasteners 218 may be tightened to ensure proper positioning of the second bonnet 216 or 404 relative to the valve body 202 or 406.

Alternatively, to temporarily replace the second bonnet 216 or 404 with the blank bonnet 500 to, for example, repair the second bonnet 216 or 404 and/or the second valve trim, the fluid pressure is reduced (e.g., fluid is drained) from the pipe and/or vessel to which the control valve 200 or 400 is coupled and then the fasteners 218 are removed from the control valve 200 or 400. The second bonnet 216 or 404 is then removed from the control valve 200 or 400. Next, the blank bonnet 500 may be positioned in the control valve 200 or 400 and the plurality of fasteners 504 may be tightened to ensure proper positioning of the blank bonnet 500 relative to the valve body 202 or 406.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A valve assembly, comprising:
a body defining a flow path between an inlet and an outlet;
opposing seating surfaces;
first valve trim comprising a first valve stem operatively coupled to a first closure member, the first closure member to engage one of the seating surfaces to control fluid flow between the inlet and the outlet during normal operation;
second valve trim comprising a second valve stem operatively coupled to a second closure member, the second closure member to engage the other one of the seating surfaces during a failure condition to restrict fluid flow between the inlet and the outlet, a surface of the second closure member to define a partial wall of the flow path during normal operation such that a profile of the flow path defined by the body and the second closure member is substantially continuous; and
a compliant seal positioned in a groove of the second closure member, wherein the compliant seal is to be spaced from the fluid flow during normal operation to substantially prevent the fluid flowing through the body from contacting the compliant seal.

2. The valve assembly as defined in claim 1, wherein the valve assembly has a flow up orientation to enable fluid flow within the flow path to urge the second closure member to sealingly engage the other one of the seating surfaces during the failure condition.

3. The valve assembly as defined in claim 1, wherein the second closure member is to be unused during normal operation.

4. A valve assembly, comprising:
a body defining a flow path between an inlet and an outlet;
opposing seating surfaces;
first valve trim comprising a first valve stem operatively coupled to a first closure member, the first closure member to engage one of the seating surfaces to control fluid flow between the inlet and the outlet during normal operation;
second valve trim comprising a second valve stem operatively coupled to a second closure member, the second closure member to engage the other one of the seating surfaces during a failure condition to restrict fluid flow between the inlet and the outlet, a surface of the second closure member to define a partial wall of the flow path during normal operation such that a profile of the flow path defined by the body and the second closure member is substantially continuous; and
a stored energy actuation mechanism to actuate the second closure member to sealingly engage the other one of the seating surfaces during a failure condition.

5. A valve assembly, comprising:
a body defining a flow path between an inlet and an outlet;
opposing seating surfaces;
first valve trim comprising a first valve stem operatively coupled to a first closure member, the first closure member to engage one of the seating surfaces to control fluid flow between the inlet and the outlet during normal operation;
second valve trim comprising a second valve stem operatively coupled to a second closure member, the second closure member to engage the other one of the seating surfaces during a failure condition to restrict fluid flow between the inlet and the outlet, a surface of the second closure member to define a partial wall of the flow path during normal operation such that a profile of the flow path defined by the body and the second closure member is substantially continuous, wherein the one of the seating surfaces comprises a first surface of a seat ring and the other one of the seating surfaces comprises a second surface of the seat ring opposite the first surface.

6. A valve assembly, comprising:
a body defining a flow path between an inlet and an outlet;
opposing seating surfaces;
first valve trim comprising a first valve stem operatively coupled to a first closure member, the first closure member to engage one of the seating surfaces to control fluid flow between the inlet and the outlet during normal operation;
second valve trim comprising a second valve stem operatively coupled to a second closure member, the second closure member to engage the other one of the seating surfaces during a failure condition to restrict fluid flow between the inlet and the outlet, a surface of the second closure member to define a partial wall of the flow path during normal operation such that a profile of the flow path defined by the body and the second closure member is substantially continuous, wherein the one of the seating surfaces comprises a surface of a seat ring and the other one of the seating surfaces comprises a surface of the body.

7. A valve assembly, comprising:
a body defining a flow path between an inlet and an outlet;
opposing seating surfaces;
first valve trim comprising a first valve stem operatively coupled to a first closure member, the first closure member to engage one of the seating surfaces to control fluid flow between the inlet and the outlet during normal operation;
second valve trim comprising a second valve stem operatively coupled to a second closure member, the second closure member to engage the other one of the seating surfaces during a failure condition to restrict fluid flow between the inlet and the outlet, a surface of the second closure member to define a partial wall of the flow path during normal operation such that a profile of the flow path defined by the body and the second closure member is substantially continuous, wherein the other one of the seating surfaces comprises a tapered surface and a surface adjacent the tapered surface, wherein a tapered portion of the second closure member is to sealingly engage the tapered surface and a compliant seal of the second closure member is to sealingly engage the surface adjacent the tapered surface.

8. A valve assembly providing safety shut off functionality, comprising:
   a body defining a flow path between an inlet port and an outlet port;
   a control valve, comprising:
      a first bonnet; and
      a first closure member to control fluid flow through the body during normal operation by sealingly engaging a first seating surface;
   a safety shut off valve, comprising:
      a second bonnet, wherein the first bonnet and the second bonnet are substantially coaxially opposed; and
      a second closure member to restrict fluid flow through the body during a failure condition by sealingly engaging a second seating surface, wherein the second closure member includes a compliant seal to be positioned in a bore defined by the body during normal operation to substantially prevent fluid flow through the body from affecting the compliant seal.

9. The valve assembly as defined in claim 8, wherein a surface of the second closure member defines a partial wall of the flow path during normal operation such that a profile of the flow path defined by the body and the second closure member is substantially continuous.

10. The valve assembly as defined in claim 8, wherein the first seating surface comprises a first surface of a seat ring and the second seating surface comprises a second surface of the seat ring opposite the first surface.

11. The valve assembly as defined in claim 8, wherein the first seating surface comprises a surface of a seat ring and the second seating surface comprises a surface of the body.

12. The valve assembly as defined in claim 8, wherein each of the first bonnet and the second bonnet is removably coupled to the body.

13. A valve assembly providing safety shut off functionality, the valve assembly comprising:
   a body defining a flow path between an inlet port and an outlet port;
   a control valve to control fluid flow through the flow path during normal operation; and
   a safety shut off valve comprising a first closure member to sealingly engage a first seating surface during a failure condition, the first closure member comprising:
      a tapered portion; and
      a compliant seal adjacent the tapered portion wherein, during the failure condition, the tapered portion is to sealingly engage a tapered surface of the first seating surface and the compliant seal is to sealingly engage a surface adjacent the tapered surface of the first seating surface.

14. The valve assembly as defined in claim 13, wherein the first closure member comprises safety integrated system hardware.

15. The valve assembly as defined in claim 13, wherein the control valve comprises a second closure member having a first material and the first closure member comprises a second material different from the first material.

16. The valve assembly as defined in claim 13, wherein the control valve comprises a seat ring defining a second seating surface opposite the first seating surface.

17. The valve assembly as defined in claim 13, wherein the first seating surface comprises a surface of the body.

18. The valve assembly as defined in claim 13, wherein the valve assembly has a flow up orientation to enable fluid flow within the flow path to urge the first closure member to sealingly engage the first seating surface during the failure condition.

* * * * *